United States Patent
Sasaki

(10) Patent No.: US 7,884,973 B2
(45) Date of Patent: Feb. 8, 2011

(54) IMAGE READING DEVICE, IMAGE FORMING APPARATUS, IMAGE READING METHOD, AND COMPUTER PRODUCT

(75) Inventor: Jun Sasaki, Tokyo (JP)

(73) Assignee: Ricoh Company, Limted, Tokyo (JP)

( * ) Notice: Subject to any disclaimer, the term of this patent is extended or adjusted under 35 U.S.C. 154(b) by 1094 days.

(21) Appl. No.: 11/600,225

(22) Filed: Nov. 16, 2006

(65) Prior Publication Data

US 2007/0109610 A1    May 17, 2007

(30) Foreign Application Priority Data

Nov. 17, 2005   (JP) ............................. 2005-333111

(51) Int. Cl.
*H04N 1/40*   (2006.01)
*H04N 1/393*  (2006.01)

(52) U.S. Cl. ...................................... 358/450; 358/471

(58) Field of Classification Search ................ 358/400, 358/401, 461, 448, 443, 474, 463, 482, 483, 358/494, 497; 382/312, 319
See application file for complete search history.

(56) References Cited

U.S. PATENT DOCUMENTS

| | | | |
|---|---|---|---|
| 6,564,028 B2 | 5/2003 | Kanno | |
| 2002/0048470 A1* | 4/2002 | Kanno | 399/205 |
| 2002/0176121 A1* | 11/2002 | Takei et al. | 358/497 |
| 2004/0169895 A1* | 9/2004 | Hashizume et al. | 358/474 |
| 2004/0233467 A1* | 11/2004 | Namizuka | 358/1.13 |
| 2004/0233479 A1* | 11/2004 | Hashizume | 358/461 |
| 2006/0193013 A1* | 8/2006 | Hoshi | 358/474 |
| 2006/0203306 A1* | 9/2006 | Hoshi | 358/497 |
| 2007/0035573 A1* | 2/2007 | Hoshi | 347/22 |

FOREIGN PATENT DOCUMENTS

| | | |
|---|---|---|
| JP | 2000358160 | * 12/2000 |
| JP | 2001-265161 | 9/2001 |
| JP | 2002-118726 | 4/2002 |
| JP | 2002-344704 | 11/2002 |
| JP | 2003-219127 | 7/2003 |
| JP | 2004-109639 | 4/2004 |
| JP | 2004-112718 | 4/2004 |
| JP | 2004-246298 | 9/2004 |
| JP | 2004-266984 | 9/2004 |
| JP | 2004-343394 | 12/2004 |
| JP | 2005-049855 | 2/2005 |
| JP | 2005-144846 | 6/2005 |
| JP | 2006-262210 A | 9/2006 |

OTHER PUBLICATIONS

Japanese Office Action dated Sep. 14, 2010 for corresponding Japanese Application No. 2005-333111.

* cited by examiner

*Primary Examiner*—Jerome Grant, II
(74) *Attorney, Agent, or Firm*—Harness, Dickey & Pierce, P.L.C.

(57) ABSTRACT

A white-level correcting unit makes an image reading unit read a white reference board, and sets a parameter corresponding to a value read by the image reading unit. A carriage includes a light source that irradiates the document, and moves in a sub-scanning direction with respect to a document to be read. When shifting to an energy-saving mode, the image reading device moves the carriage to a position of the white reference board before entering to the energy-saving mode.

9 Claims, 8 Drawing Sheets

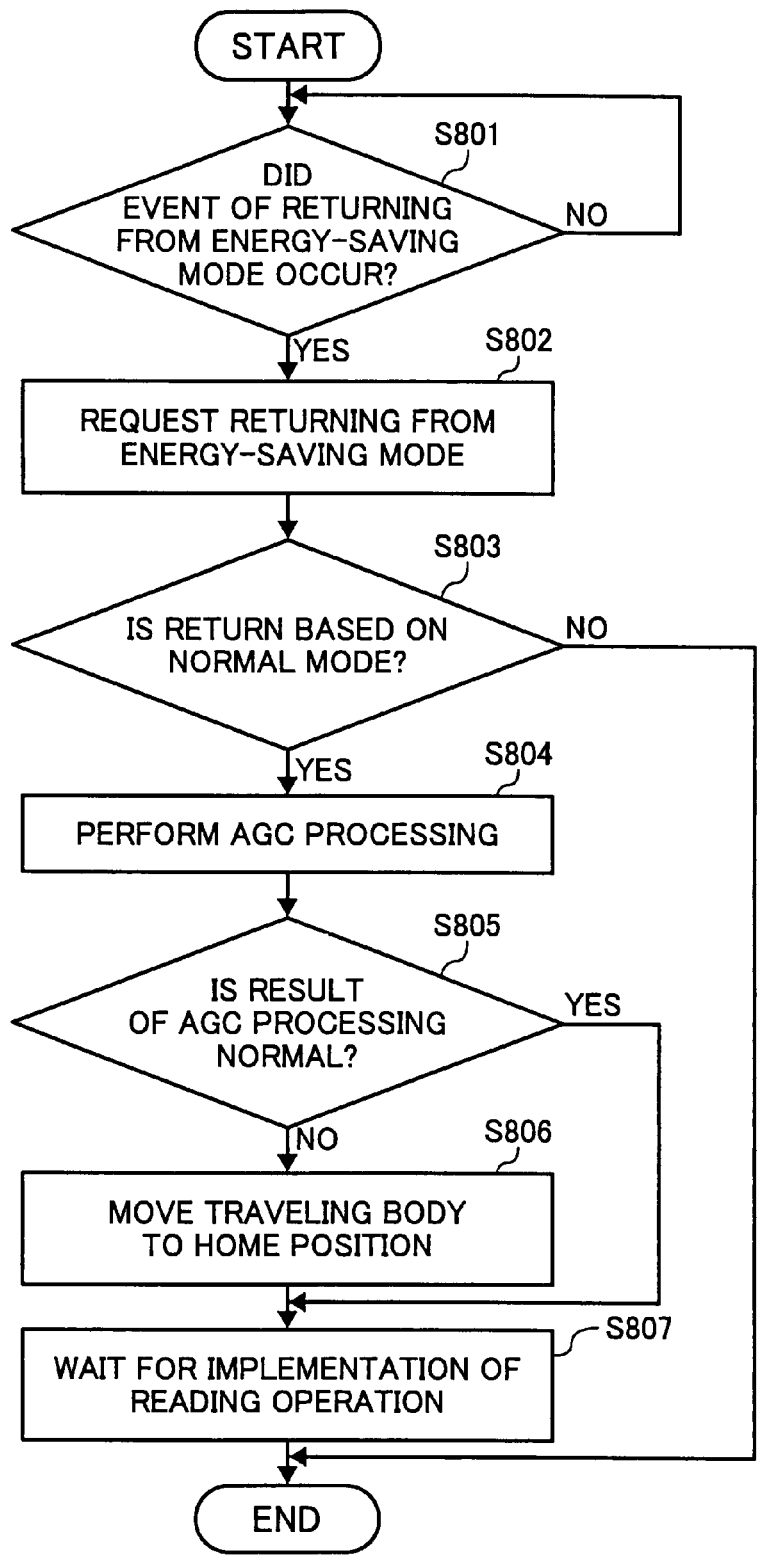

IMAGE READING DEVICE, IMAGE FORMING APPARATUS, IMAGE READING METHOD, AND COMPUTER PRODUCT

CROSS-REFERENCE TO RELATED APPLICATIONS

The present document incorporates by reference the entire contents of Japanese priority document, 2005-333111 filed in Japan on Nov. 17, 2005.

BACKGROUND OF THE INVENTION

1. Field of the Invention

The present invention relates to a technology for improving a response speed of image reading device and an image forming apparatus when returning from an energy-saving mode.

2. Description of the Related Art

An image forming apparatus such as a printing machine, a copier, a printer, and a facsimile that is typically used has recently become widespread at offices or at home for the reasons of reproducibility, stability of images, and the like. It is general that this type of image forming apparatus operates with its utility system of keeping power on as the nature of the product. More attention is paid to improvement of its availability than reduction of energy consumption. Now, a problem of energy consumption has become evident, however, there is a need of a reduced consumption of energy or inhibited use of exhausted energy source such as fossil fuel that affects global warming.

Japanese Patent Application Laid-open No. 2004-343394 proposes an image forming apparatus, which, in image forming apparatus in which an operating display unit is controlled by different central processing units (CPU) based on extension modes of an application of processing image forming, increases response speed when returning from an energy saving mode, in which a power supply is limited to a necessity minimum, by controlling the operating display unit by a CPU having a shorter initial operating time among plural CPUs controlling the operating display unit, when supplying power to the operating display unit to start the image forming apparatus, and a method of driving the operating display unit.

Japanese patent Application Laid-open No. 2004-246298 proposes an image reading device and an image forming apparatus, which, in image reading device and image forming apparatus having a carriage movable in the scanning direction of a document that is mounted with a light source irradiating a document and a mirror directing a reflected light from the document irradiated by the light source, a sensor detecting a home position of the carriage, and a line sensor reading images of the document based on the reflected light from the mirror, when aligning the carriage through homing processing, check whether it is a press scan mode and provide a quick start, if in the affirmative, instead of homing operation when the sensor detects the carriage.

Japanese Patent Application Laid-open No. 2004-112718 proposes an image processing apparatus, which, in image processing apparatus that can shift to the energy-saving mode, includes a CPU performing integral control of the whole apparatus, an energy-saving control unit having a function of returning from the energy-saving mode to a normal operation mode and smaller power consumption than the CPU, and a detecting unit of detecting a return trigger from the energy-saving mode. When shifting to the energy-saving mode, the image processing apparatus can reduce power consumption in the energy-saving mode by supplying power only to the energy-saving control unit and the detecting unit and return from the energy-saving mode to the normal operation mode in a shorter time.

Japanese Patent Application Laid-open No 2003-219127 proposes an image reading device, which, in image reading device photoelectrically converting images of a document at a reading unit including an optical system mounted on a charge-coupled device (CCD) and a moving mechanism and enabling an image reading condition, such as black level and white level of photoelectrically converted image signals to be set, includes an unit of setting an image reading condition and an unit of storing the set image reading condition when shifting to the energy-saving mode, and when returning from the energy-saving mode, can set the stored image reading condition and read images, as a result, to have a shorter time to return from the energy-saving mode instead of adjusting the image reading condition.

Japanese Patent Application Laid-open No. 2001-265161 proposes a fixing device, which controls changing the number of supplied sheets in starting copies-per-minute (CPM) down control based on a fixed temperature when starting supplying sheets immediately after reloading to improve fixing quality without any control difference immediately after reloading.

However, the conventional technology has the following problem. When a traveling body that scans a document is moved to a home position, the conventional image forming apparatus shifts to the energy-saving mode. When returning from the energy-saving mode, therefore, it is necessary to move the traveling body for performing auto-gain-control (AGC) processing to a position at which a white reference board is installed and it takes more time to return from the energy-saving mode due to the moving time.

SUMMARY OF THE INVENTION

It is an object of the present invention to at least partially solve the problems in the conventional technology.

An image reading device according to one aspect of the present invention includes a white-level correcting unit that makes an image reading unit read a white reference board, and sets a parameter corresponding to a value read by the image reading unit; and a carriage that includes a light source that irradiates a document to be read, and moves in a sub-scanning direction with respect to the document. When shifting to an energy-saving mode, the image reading device moves the carriage to a position of the white reference board before entering to the energy-saving mode.

An image forming apparatus according to another aspect of the present invention includes an image reading device that includes a white-level correcting unit that makes an image reading unit read a white reference board, and sets a parameter corresponding to a value read by the image reading unit; and a carriage that includes a light source that irradiates a document to be read, and moves in a sub-scanning direction with respect to the document. When shifting to an energy-saving mode, the image reading device moves the carriage to a position of the white reference board before entering to the energy-saving mode.

An image reading method according to still another aspect of the present invention includes white-level correcting including reading a white reference board, and setting a parameter corresponding to a value read at the reading; and moving, when shifting to an energy-saving mode, a carriage, which includes a light source that irradiates a document to be read and moves in a sub-scanning direction with respect to the document, to a position of the white reference board before entering to the energy-saving mode.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is a flowchart showing a procedure of processing when returning from the energy-saving mode.

DETAILED DESCRIPTION OF THE PREFERRED EMBODIMENTS

Exemplary embodiments of the present invention will be explained in detail below with reference to the accompanying drawings.

Figure 1:
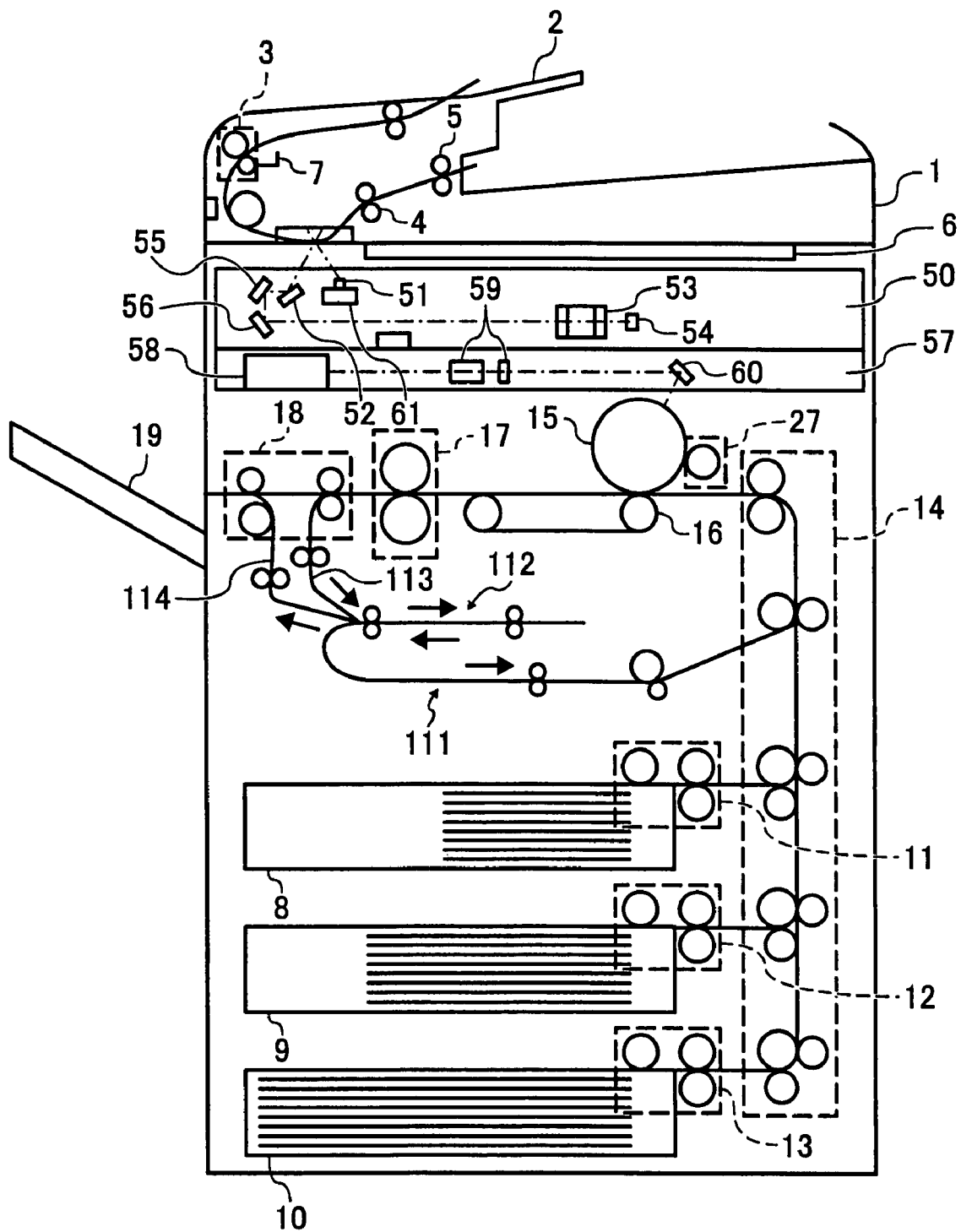
FIG. 1 is a schematic diagram of an image forming apparatus according to an embodiment of the present invention.

FIG. 1 is a schematic diagram of an image forming apparatus according to an embodiment of the present invention. The image forming apparatus according to the present embodiment includes an automatic document feeder (ADF) 1, a document glass 2, a feeding roller 3, a feeding roller 4, a discharging roller 5, a contact glass 6, a document setting detector 7, a first tray 8, a second tray 9, a third tray 10, a first paper feeding unit 11, a second paper feeding unit 12, a third paper feeding unit 13, a vertical carrier unit 14, a photo-sensitive element 15, a carrier belt 16, a fixing unit 17, a discharging unit 18, a discharging tray 19, a reading unit 50, an exposure lamp 51, a first mirror 52, a lens 53, a CCD image sensor 54, a second mirror 55, a third mirror 56, a writing unit 57, a laser output unit 58, an image forming lens 59, a mirror 60, a traveling body 61, a double-sided carrier unit 111, a reversing unit 112, a double-sided paper carrier path 113, and a reversed-paper discharging carrier path 114.

Figure 2:
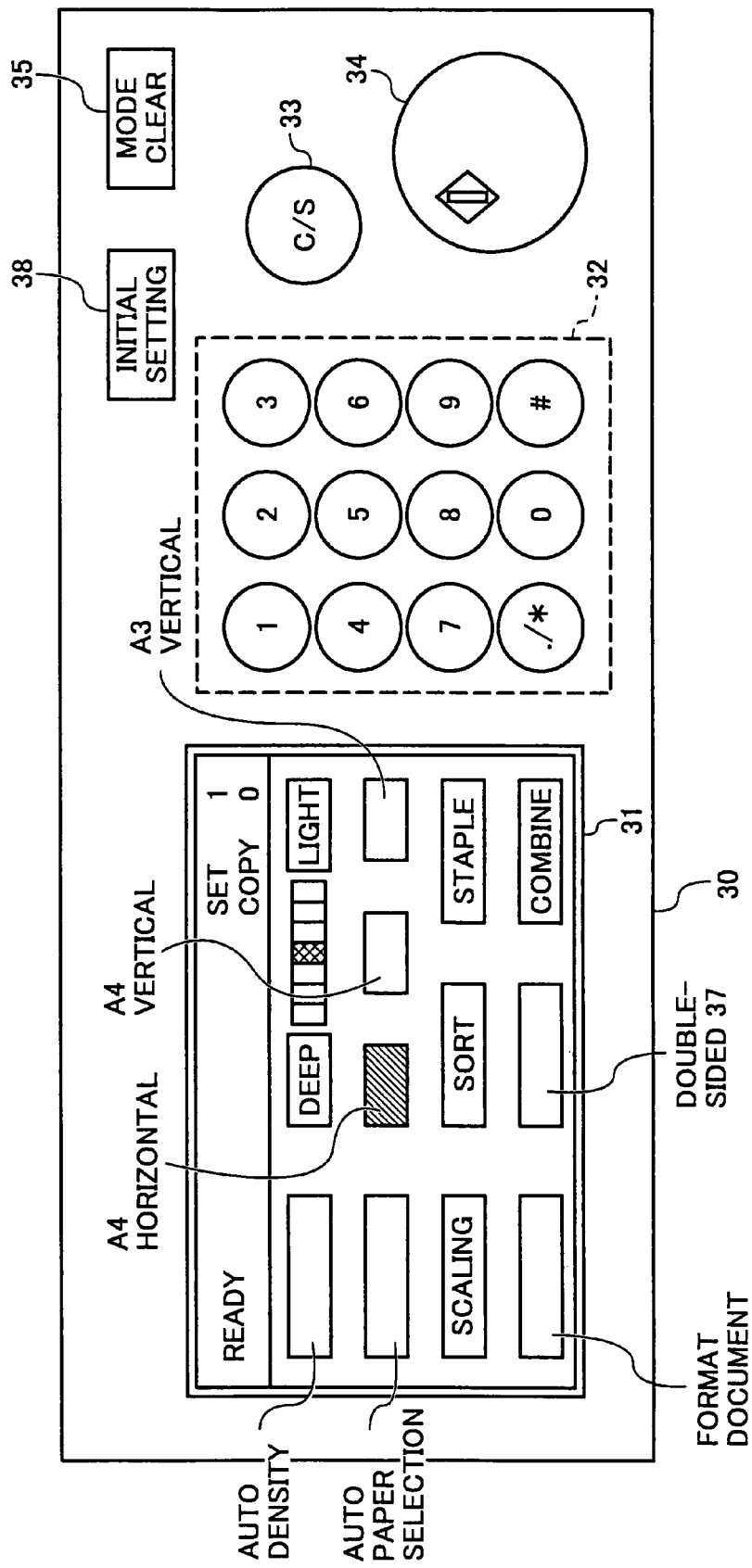
FIG. 2 is a schematic diagram of an operating unit.

A batch of documents placed on the document glass 2 of the ADF 1 with the image side of the document up, when a start key 34 on an operating unit 30 shown in FIG. 2 is depressed, are fed by the feeding roller 4 to a position at which they are read from a document placed at the bottom of the documents. The image forming apparatus according to the present embodiment has a function of counting up the number of documents when finishing feeding a document. The fed documents are carried to a position at which they are read and their image data is read by the reading unit 50. An image reading device according to the present embodiment can compensate for degradation of image quality that occurs when dust settles on the position of the reading unit 50 at which data is read so that the position is altered.

The document that has been read is discharged through the feeding roller 4 and the discharging roller 5. In addition, when the document setting detector 7 detects the presence of a next document on the document glass 2, the document is fed to the position at which it is read in the same manner as the previous document. The feeding rollers 3, 4 and the discharging roller 5 are driven by a carrier motor 26.

Sheets of transfer paper loaded on the first tray 8, the second tray 9, and the third tray 10 are fed by the first paper feeding unit 11, the second paper feeding unit 12, and the third paper feeding unit 13 respectively and are carried by the vertical carrier unit 14 to a position coming into contact with the photo-sensitive element 15. The image data read by the reading unit 50 is written on the photo-sensitive element 15 through a laser from the writing unit 57 and the written data is passed through a developing unit 27 to form a toner image. The sheet of transfer paper is carried by the carrier belt 16 at the same velocity as the rotation of the photo-sensitive element 15 and the toner image on the photo-sensitive element 15 is transferred thereon. Then, the image is fixed by the fixing unit 17 and the transferred sheet is discharged by the discharging unit 18 to the discharging tray 19.

When forming an image on both sides of the sheet of transfer paper, the sheets that are fed from each of the trays 8 to 10 and on which an image is formed are, instead of leading them to the side of the discharging tray 19, carried to the double-sided paper carrier path 113 and are switchback reversed by the reversing unit 112 to send to the double-sided carrier unit 111. The sheets sent to the double-sided carrier unit are carried to the vertical carrier unit 14 again and have an image printed on their rear sides for ejection. When discharging a reversed sheet of transfer paper, the sheet switchback-reversed by the reversing unit 112 is, without sending to the double-sided unit, sent to the reversed-paper discharging carrier path 114 for ejection.

The photo-sensitive element 15, the carrier belt 16, the fixing unit 17, the discharging unit 18, and the developing unit 27 are driven by a main motor 25. Driving force of the main motor 25 is transmitted to each of the paper feeding units 11 to 13 through each of paper feed clutches 22 to 24. The driving force of the main motor 25 is also transmitted to and drives the vertical carrier unit 14 through a middle clutch 21.

The reading unit 50 includes the contact glass 6 on which a document is placed and an optical scanning system. The optical scanning system includes the exposure lamp 51, the first mirror 52, the lens 53, the CCD image sensor 54, and the like. The exposure lamp 51 is fixed on the traveling body 61. The first mirror 52 is fixed on a first carriage, and the second and third mirrors 55, 56 are fixed on a second carriage. When reading a document image, the traveling body 61, the first carriage, and the second carriage are mechanically operated lest an optical path length should change. The optical scanning system is driven by a motor for driving a scanner. A document image is read by the CCD image sensor 54 and is converted to an electric signal for processing.

The writing unit 57 includes the laser output unit 58, the image forming lens 59, and the mirror 60. A laser diode serving as a laser light source and a polygon mirror rotated at a fixed high speed by a motor are provided inside of the laser output unit 58.

The laser beam output from the writing unit 57 is irradiated to the photo-sensitive element 15 of an image forming system. A beam sensor generating a main scanning synchronous signal is arranged at a position near an end of the photo-sensitive element 15 to which a laser beam is irradiated.

Figure 3:
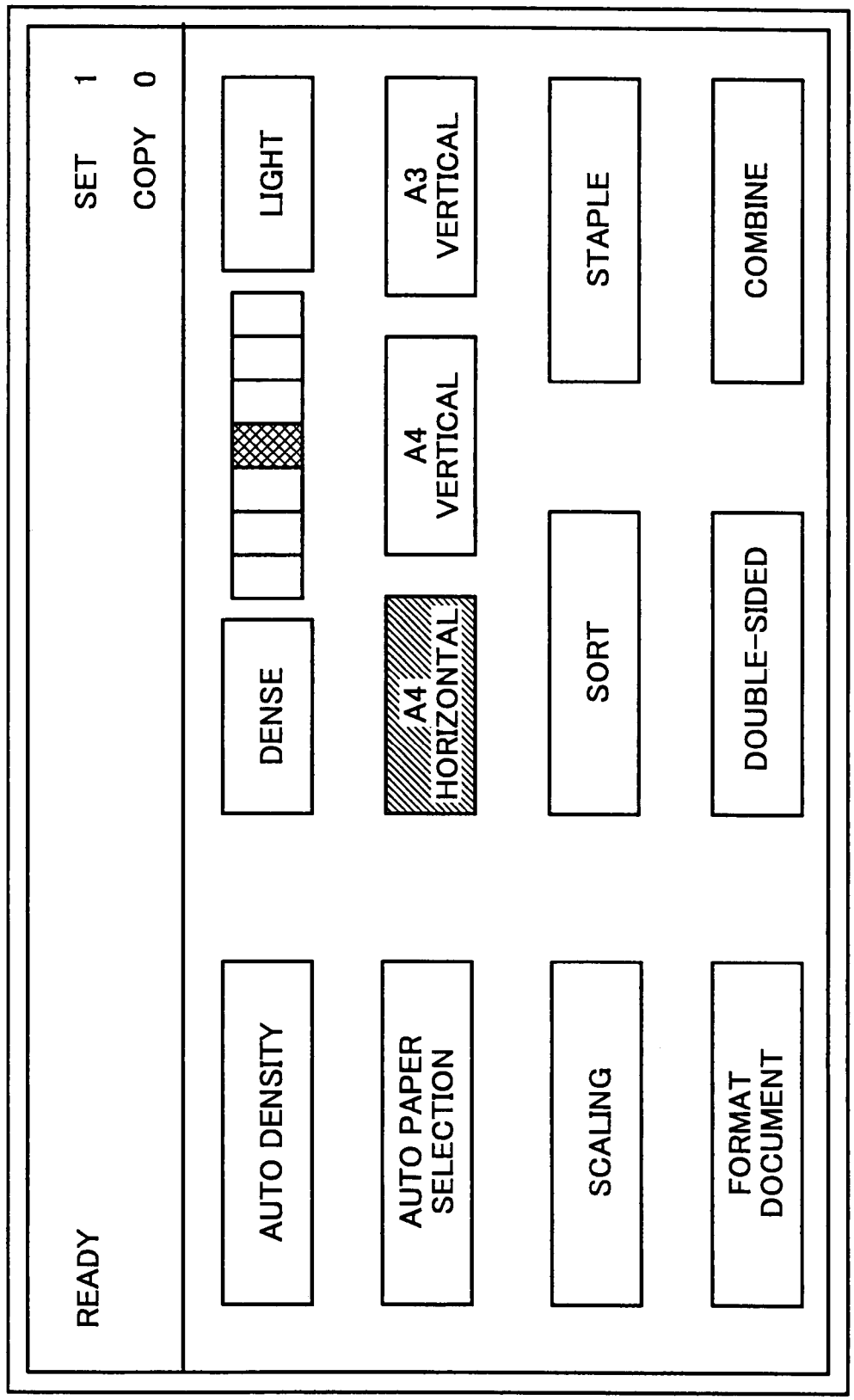
FIG. 3 is an example of displaying an LCD display unit.

FIG. 3 is a display example of a liquid-crystal-display (LCD) touch panel 31 of the operating unit 30.

When an operator touches a key displayed on the LCD touch panel 31, the color of the selected key indicating a function is reversed into black. In addition, when specifying details of the function (for example, a scaling value in a case of scaling), an operator touches a key and a setting screen showing details of the function is then displayed. Thus, the LCD touch panel by use of a dot indicator can graphically provide a suitable display at that time.

Figure 4:
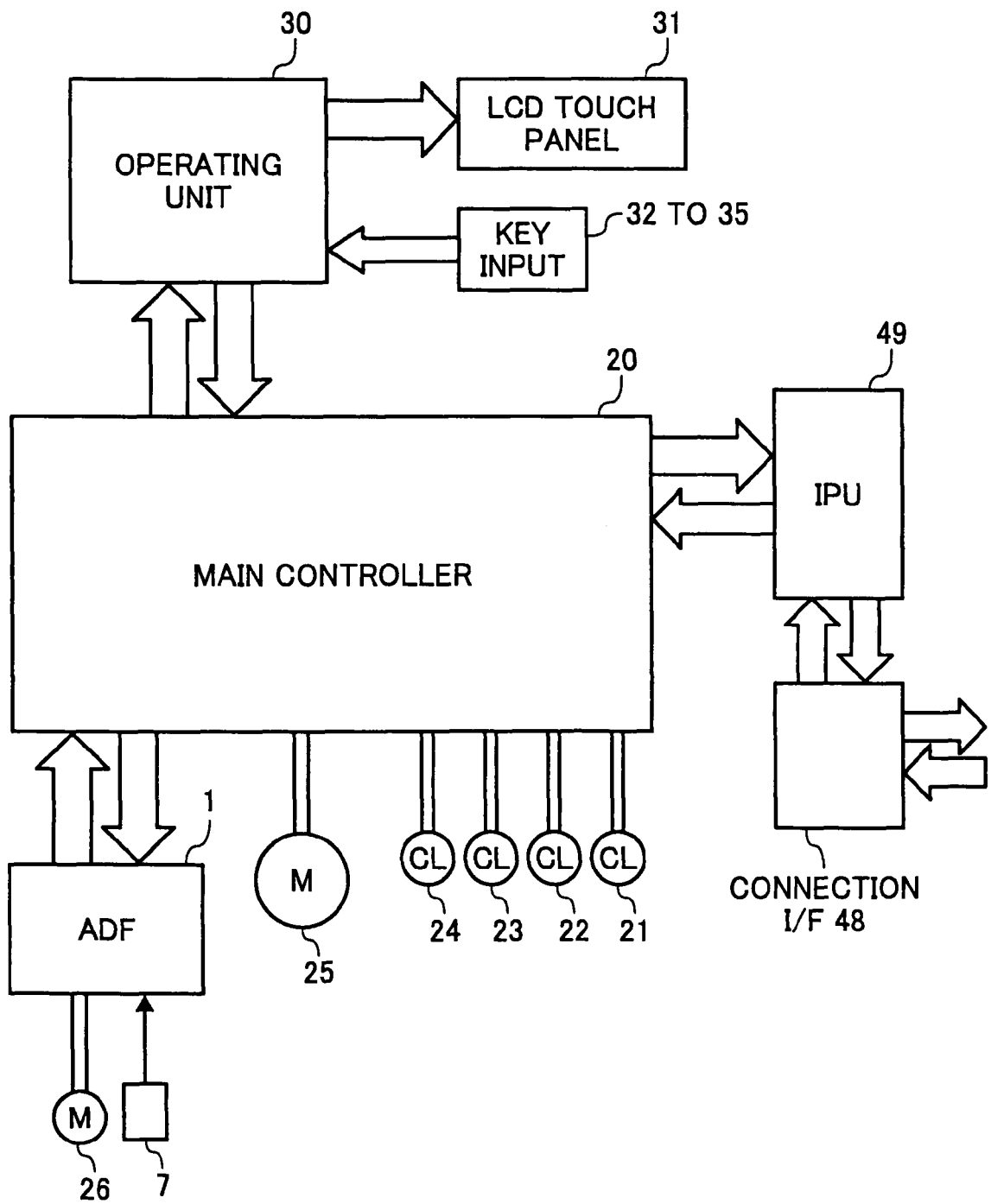
FIG. 4 is a diagram showing a configuration of a control unit having a main controller in its center.

A description will be given below to a configuration of a control unit with reference to FIG. 4, paying a particular emphasis on a main controller of the image forming apparatus according to the present embodiment.

A main controller 20 controls the whole image forming apparatus. The main controller 20 is connected to distributed control units, such as the operating unit 30 of providing a display to an operator and control to input function settings from an operator, an image processing unit (IPU) 49 exerting controls over a scanner, writing a document image in an image memory, and forming an image from the image memory, and the ADF 1.

The main controller 20 is connected to a connection I/F 48 that is connected to plural image forming apparatus and performs transmitting/receiving information about a configuration and function of the image forming apparatus and its operation control. The main controller 20 receives information about the image forming apparatus connected through the connection I/F 48, sets operations to control the connected operations or receives requirements from another connected image forming apparatus to control operations of the apparatus itself.

Each of the distributed control units and the main controller 20 communicate each other about mechanical states and operation commands as needed. The main motor 25 and various types of clutches 21 to 24 necessary to carry sheets are connected to the main controller 20.

Figure 5:
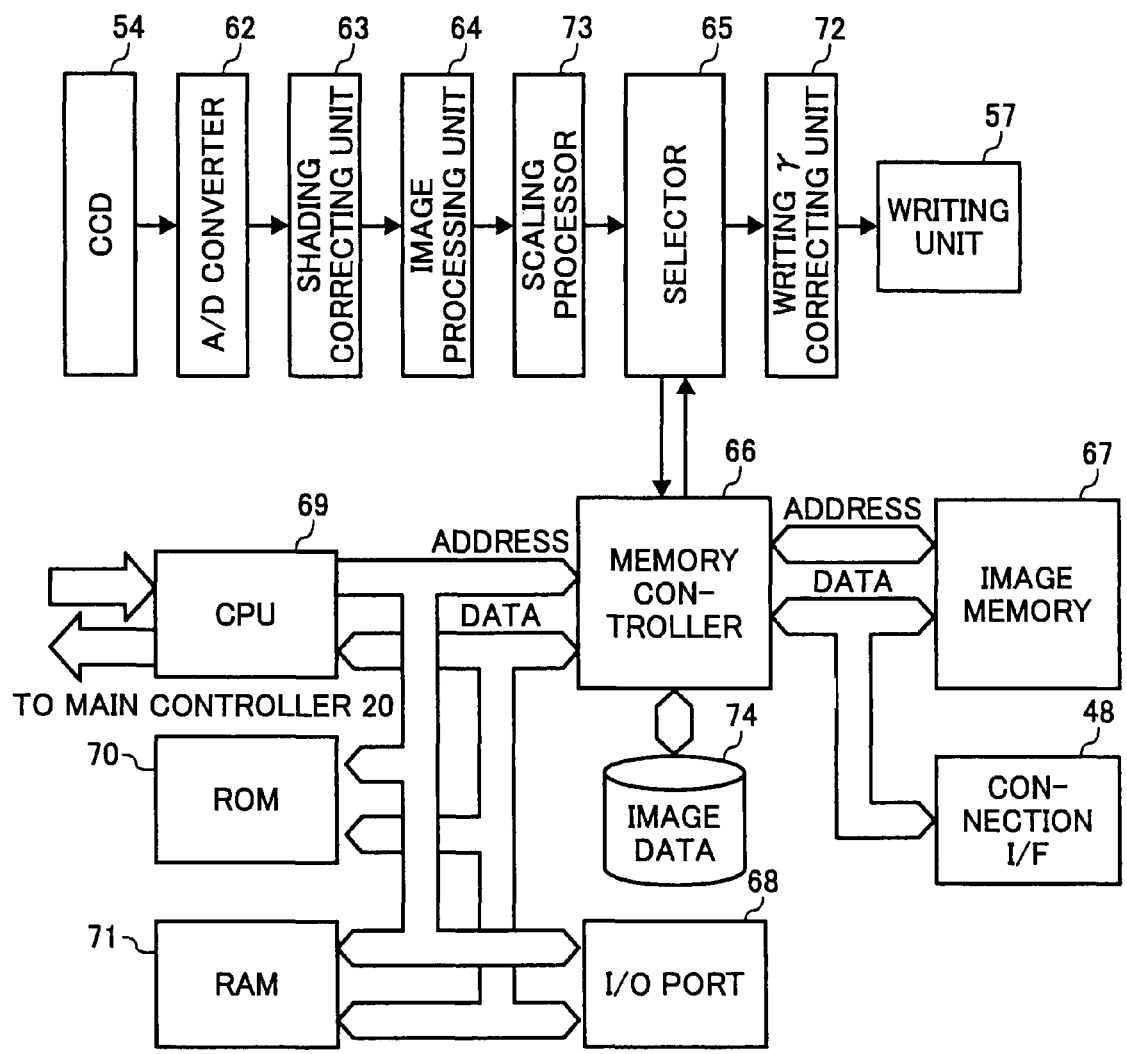
FIG. 5 is a schematic block diagram illustrating an image processing unit (IPU)

The configuration and operations of the IPU 49 will be explained below with reference to FIG. 5.

The IPU 49 includes the CCD image sensor 54, an A/D converter 62, a shading correcting unit 63, an image processing unit 64, a scaling processor 73, a selector 65, a writing γ correcting unit 72, the writing unit 57, a CPU 69, a ROM 70, a RAM 71, a memory controller 66, a color conversion processor 100, an I/O port 68, an image memory 67, the connection I/F 48, and an image data 74.

First, the exposure lamp 51 irradiates a light beam and the reflected light beam is photoelectrically converted by the CCD image sensor 54 and is converted to a digital signal at the A/D converter 62. Shading correction is performed to an image signal converted to the digital signal at the shading correcting unit 63 before MTF correction, γ correction, and the like are performed thereto at the image processing unit 64. The image signal passing through the scaling processor 73 is scaled up/down based on a scaling ratio and is transmitted to the selector 65. At the selector 65, the destination of the image signal is switched to the writing γ correcting unit 72 or the memory controller 66. The image signal passing through the writing γ correcting unit 72 has writing γ corrected based on an image-making condition and is transmitted to the writing unit 57.

The image signal can bidirectionally be input/output between the memory controller 66 and the selector 65. Further, the IPU 49 includes the CPU 69 that makes settings with respect to the memory controller 66 and controls the writing unit 57, and a ROM 70 and RAM 71 that store the program or data. The CPU 69 can write and read data of the image memory 67 through the memory controller 66.

The connection I/F 48 is connected to a data bus to the memory controller for transmission/reception of image information to enable input/output of data. The image information is transmitted through the image memory 67 in response to each of the different data transfer rates among image forming apparatus.

That is, when outputting an image, image data is stored from the memory controller 66 to the image memory 67 and data is successively read from the image memory 67 in response to each of the different data transfer rates among image forming apparatus to transmit to the connection I/F 48. When inputting an image, image data transmitted from the connection I/F 48 is stored in the image memory 67 before the image data is processed inside the unit from the image memory 67 through the memory controller 66. The above configuration makes it possible to realize a connected operation without subjecting functional restrictions of the image forming apparatus.

The document image transmitted to the memory controller 66, after an image compressing device in the memory controller 66 compresses the image data, is transmitted to the image memory 67. When compressing images, it is possible to write 256 gradation data of a maximum size image directly in the image memory 67, and a large amount of image memory is used in images of a document. Therefore, image compression enables effective use of limited image memory 67. Image compression also makes it possible to store much document image data once so that stored document image data can be, as a sort function, output in the order of page. In this event, images are output, while data in the image memory 67 is successively extended in an extending device of the memory controller 66. The function is generally referred to "electronic sort".

Images of plural documents can be successively read in divided areas of a sheet of transfer paper in the image memory 67 by use of a function of the image memory. For example, images corresponding to four documents are read in sequence in areas divided into four in a sheet of transfer paper of the image memory 67 so that four documents are combined into one sheet of transfer paper as "an image", resulting in collected output. The function is generally referred to as "combine copy".

Images in the image memory 67 can be accessed from the CPU 69. For this reason, contents of the image memory 67 can be processed. For instance, there is processing of thinning images, cutting out an image into an arbitrary shape or the like. Data is written in a register of the memory controller 66 and then processing of the image memory 67 is performed. The processed image is held in the image memory 67 again.

The CPU 69 reads the contents of the image memory 67, which pass through the I/O port 68 and are transmitted to the operating unit 30 as the image data 74. Since the operating unit 30 typically has low-resolution screen display, document images of the image memory 67 are subjected to thinning images to transmit to the operating unit 30. The image memory 67 contains much image data, thereby enabling use of a hard disc. The use of a hard disc makes it possible to persistently maintain images without an external power source. It is general to use the hard disc when reading and maintaining plural fixed documents (format document) by a scanner.

Figure 6:
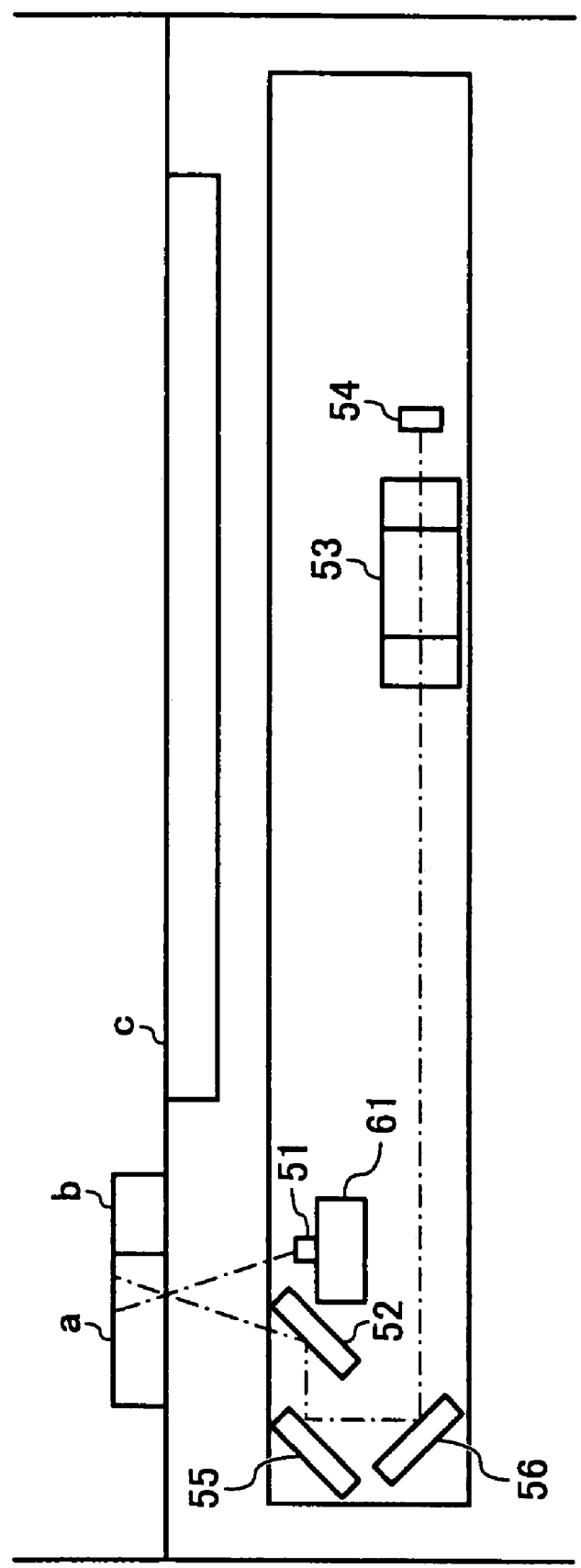
FIG. 6 is a schematic diagram of a reading unit.

With reference to FIG. 6, a description will be now given to operations when the image forming apparatus according to the present embodiment shifts to an energy-saving mode, in which a power supply is limited to a necessity minimum, and when it returns from the energy-saving mode. The energy-saving mode is a function of reducing power consumption in the image forming apparatus. More specifically, the function means, when the image forming apparatus stops operating for a certain time, to stop supplying power to the display or the hard disc, or to decrease operational speed of the CPU.

In the image forming apparatus according to the present embodiment, when shifting to the energy-saving mode, the control unit connected to the main controller 20 is turned off. The main controller 20 instructs each of the control units to shift to the energy-saving mode and each of the control units shifts to the energy-saving mode.

When shifting to the energy-saving mode, the main controller 20 controls the reading unit 50 to perform the following operation. The reading unit 50 that receives the instruction of shifting to the energy-saving mode from the main controller 20 moves the traveling body 61 to a position of a white reference board b and directly shifts to the energy-saving mode.

When returning from the energy-saving mode, the main controller 20 instructs the reading unit 50 to return from the energy-saving mode. The reading unit 50 that receives the instruction of returning from the energy-saving mode immediately performs AGC processing (white-level correction and black-level correction). In an image forming apparatus of the conventional art, when shifting to the energy-saving mode, the traveling body 61 is moved to a home position (dust avoiding position) c before the reading unit 50 is turned off. Thus, when the image forming apparatus returns from the energy-saving mode, the reading unit 50 moves the traveling body 61 to a position of a white reference board b and then needs to perform AGC processing. On the other hand, in the image forming apparatus according to the present embodiment, when returning from the energy-saving mode, the reading unit 50 does not move the traveling body 61 but can perform AGC processing at once, thereby leading to a reduction of time that is needed to return from the energy-saving mode.

After returning from the energy-saving mode and performing AGC processing, when the result is in a normal condition, the reading unit 50 moves the traveling body 61 to a DF document reading position a or a dust avoiding position c, and waits for an instruction of reading a document from the main controller 20.

On the other hand, when something is wrong with AGC processing, the reading unit first moves the traveling body 61 to the DF document reading position a or the dust avoiding position c and then moves it to the white reference board b again to perform AGC processing. According to the operation, when the image forming apparatus shifts to the energy-saving mode, even if the reading unit 50 is turned off without the traveling body 61 stopping at a position of the white reference board b, something unusual is detected based on the result of AGC processing, the position of the traveling body 61 is modified, and AGC processing is performed with the traveling body located at a right position.

Figure 7:
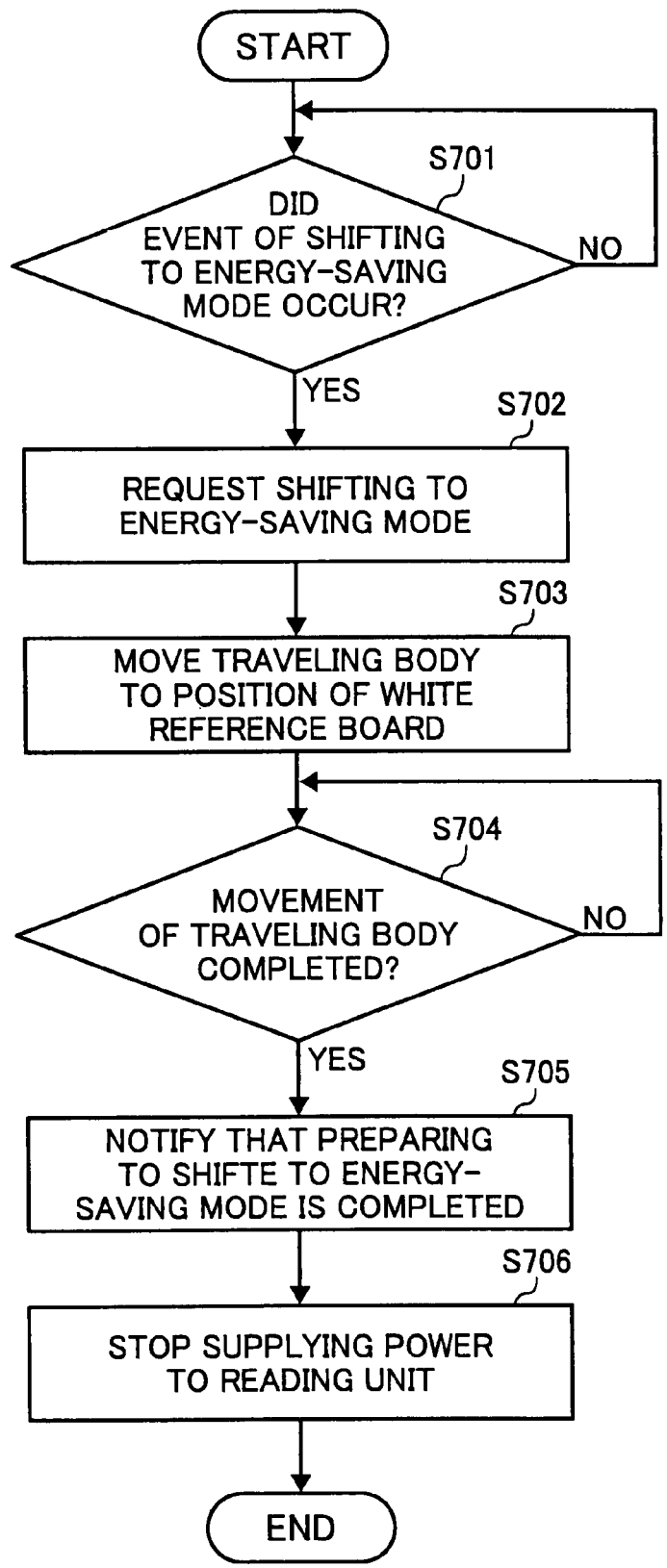
FIG. 7 is a flowchart showing a procedure of processing when shifting to an energy-saving mode.

A procedure of processing that the reading unit 50 shifts to the energy-saving mode will next be explained with reference to FIG. 7.

First, when the image forming apparatus is in a standby condition, the main controller 20 waits for an instruction of performing image forming from the operating unit 30 (at step s701). When the user requires the main controller 20 to shift to the energy-saving mode via the operating unit 30, the main controller 20 requires the control unit and the like to shift to the energy-saving mode (at step s702) such as when the user does not operate the operating unit 30 for a certain time and the like (hereinafter, refers to an event of shifting to the energy-saving mode) (at step s701, Yes).

The reading unit 50 that the main controller 20 requires to move to the energy-saving mode (at step s702) moves the traveling body 61 to a position of a white reference board b (at step s703). Upon completion of moving the traveling body 61 to the position of the white reference board b (at step s704, Yes), the reading unit 50 notifies the main controller 20 of finishing preparing to shift to the energy-saving mode (at step s705).

The main controller 20 that receives the notification from the reading unit 50 to the effect that the shift to the energy-saving mode is ready stops supplying power to the reading unit 50 (at step s706).

Referring to FIG. 8, a procedure of processing to return the reading unit 50 from the energy-saving mode will be explained below.

When the image forming apparatus is in the energy-saving mode, the main controller 20 waits for an instruction of requiring to return from the energy-saving mode from the operating unit 30 (hereinafter, refers to an event of returning from the energy-saving mode) (at step s801).

When the event of returning from the energy-saving mode occurs (at step s801, Yes), the main controller 20 resumes supplying power to the control unit and the like and requires each of the control units to return from the energy-saving mode (at step s802).

The reading unit 50 that the main controller 20 requires to return from the energy-saving mode determines whether it is a return based on a normal mode (all of the control units connected to the main controller 20 are in a standby condition) or it is a return based on a silent mode (for example, when returning from the energy-saving mode, only the operating unit 30 that does not generate noise is in a standby condition) (at step s803).

The reading unit 50, when the return from the energy-saving mode required by the main controller 20 is a return to a silent mode (at step s803, No), does not perform AGC processing or the like and waits for an instruction of requiring a shift to a normal mode from the main controller 20.

On the other hand, the reading unit 50, when the return from the energy-saving mode required by the main controller 20 is a return to a normal mode (at step s803, Yes), performs AGC processing (at step s804). Here, in the present embodiment, when shifting to the energy-saving mode, the traveling body 61 has been already moved to a position of a white reference board b, the reading unit 50 immediately performs AGC processing. As a result, it is possible to reduce time to return from the energy-saving mode. When performing AGC processing (at step s804), the main controller 20 determines whether the result of AGC processing is suitable (at step s805).

The reading unit 50, when detecting something wrong with the result of AGC processing (at step s805, No), moves the traveling body 61 to a DF document reading position a or a dust avoiding position c once, and then moves it to the position of the white reference board b to perform AGC processing (at step s806).

When AGC processing properly comes to an end (at steps s806 and s805, Yes), the reading unit 50 moves the traveling body 61 to the DF document reading position a or the dust avoiding position c and waits for implementation of reading operation (at step s807).

According to the processing, when the image forming apparatus shifts to the energy-saving mode, even if the traveling body 61 does not stop at the position of the white reference board b and the reading unit 50 is turned off, something unusual is detected based on the result of AGC processing, the position of the traveling body 61 is modified, and AGC processing is performed with the traveling body located at a right position.

According to the invention, the reading unit required to shift to the energy-saving mode moves the traveling body to a position of a white reference board. Upon completion of moving the traveling body to the position of the white reference board, a shift to the energy-saving mode is performed and, when returning from the energy-saving mode, AGC processing is immediately performed (white level correction and black level correction), thereby reducing time to return from the energy-saving mode.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading device comprising:
a white-level correcting unit that makes an image reading unit read a white reference board, and sets a parameter corresponding to a value read by the image reading unit; and
a carriage that includes a light source that irradiates a document to be read, and moves in a sub-scanning direction with respect to the document, the carriage, wherein
when shifting to an energy-saving mode, the image reading device moves the carriage to a position of the white reference board before entering to the energy-saving mode.

2. The image reading device according to claim 1, wherein
when returning from the energy-saving mode, the image reading unit reads the white reference board without moving the carriage.

3. The image reading device according to claim 2, wherein
when there is an error in the parameter set by the white-level correcting unit, the image reading device moves the carriage to a predetermined position before moving the carriage to the white reference board, to read the white reference board again, and
the white-level correcting unit resets the parameter.

4. The image reading device according to claim 3, wherein
the predetermined position is either one of a position for starting reading the document and a position for avoiding a dust.

5. An image forming apparatus comprising:
an image reading device that includes
a white-level correcting unit that makes an image reading unit read a white reference board, and sets a parameter corresponding to a value read by the image reading unit; and
a carriage that includes a light source that irradiates a document to be read, and moves in a sub-scanning direction with respect to the document, wherein
when shifting to an energy-saving mode, the image reading device moves the carriage to a position of the white reference board before entering to the energy-saving mode.

6. An image reading method comprising:
white-level correcting including
reading a white reference board; and
setting a parameter corresponding to a value read at the reading; and
moving, when shifting to an energy-saving mode, a carriage, which includes a light source that irradiates a document to be read and moves in a sub-scanning direction with respect to the document, to a position of the white reference board before entering to the energy-saving mode.

7. The method according to claim 6, wherein
the reading includes reading, when returning from the energy-saving mode, the white reference board without moving the carriage.

8. The method according to claim 7, further comprising:
moving, when there is an error in the parameter set at the white-level correcting, the carriage to a predetermined position before moving the carriage to the white reference board, to read the white reference board again; and
resetting the parameter.

9. The method according to claim 8, wherein
the predetermined position is either one of a position for starting reading the document and a position for avoiding a dust.

* * * * *